Patented Oct. 16, 1934

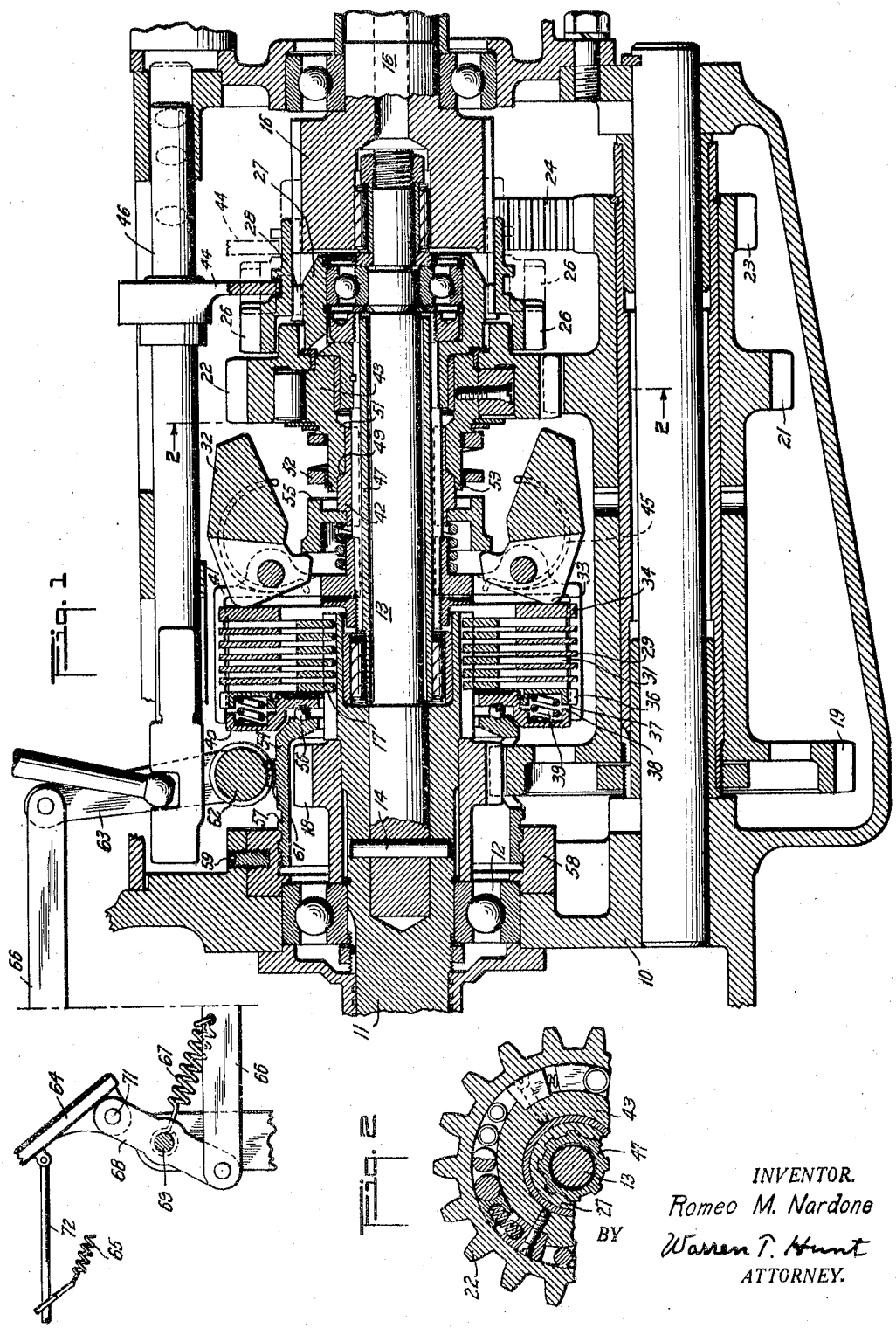

1,977,007

UNITED STATES PATENT OFFICE 1,977,007

TRANSMISSION

Romeo M. Nardone, East Orange, N. J., assignor, by mesne assignments, to Eclipse Aviation Corporation, East Orange, N. J., a corporation of New Jersey Application April 28, 1932, Serial No. 608,121

18 Claims. (Cl. 74—472)

This invention relates to transmission mechanism, and more particularly to an automatic variable speed transmission mechanism adapted for use on automotive vehicles.

An object of the invention is to provide an automatic variable speed transmission in which the speed changes are automatic but also modified to some extent at the will of the operator.

Another object of the invention is to provide an automatic transmission mechanism in which the tendency to gear change may be modified by actuation of one of the ordinary vehicle or vehicle engine controls.

Another object of the invention is to provide an automatic variable speed transmission in which the tendency to gear change may be varied by operation of the accelerator pedal.

A feature of the illustrated embodiment relates to the arrangement of the high speed gear clutch which is so influenced by the operation of a vehicle control, preferably the engine accelerator pedal, as to increase the tendency to change to a lower gear ratio when the engine throttle is open.

Other features and objects of the invention will be apparent from the following description, in connection with which a preferred embodiment of the invention has been illustrated in the accompanying drawing, in which:

Fig. 1 is a vertical sectional view of the improved transmission; and,

Fig. 2 is a view taken substantially along the line 2—2 of Fig. 1 illustrating the overrunning clutch used in the low speed gear.

Referring to the drawing, 10 is the transmission housing within which is mounted the engine or driving shaft 11 having a suitable bearing 12 in the housing and provided with an extension 13 preferably formed of a separate piece and secured to the shaft 11 by a pin 14. The driven shaft 16 is connected to the driving shaft 11 by a plurality of connecting devices, one of which is the friction clutch 17 adapted to connect the driving and driven shafts 11 and 16 respectively in a direct ratio and corresponding to the high speed gear. The low speed train includes gears 18, 19, 21 and 22, the last named gear including an overrunning clutch of any preferred design, such as the roller clutch shown in Fig. 2, whereby the driven shaft 16 may overrun the gear 22 in a clockwise direction but which will cause gear 22 to drive shaft 16 when clutch 17 is released. A reverse gear train is also provided which includes gear 23, idler gear 24, and gear 26, which last named gear is splined to the driven shaft 16 and adapted to mesh either with reverse idler gear 24 or to directly couple the coupling member 27 to the driven shaft 16 by means of teeth 28 when the gear 26 is in the position shown by full lines in Fig. 1. The broken line position shows gear 26 intermediate the coupler 27 and reverse gear 24, in which position the transmission is in neutral and no connection is provided between the driving shaft 11 and driven shaft 16.

Clutch 17, which may be termed the high speed clutch, includes a series of friction plates 29 and 31 which are adapted to be pressed into engagement by the centrifugal weights 32, the noses 33 of which engage pressure plate 34 and force it toward the left to compress the friction discs against the resilient backing plate 36 which is splined to the barrel or housing 41 of the clutch, and is adapted to move a slight distance toward the left until shoulders 37 and 38 abut, which are normally separated by springs 39. Plates 31 and 29 are connected with the driving shaft 11 and housing 41 respectively whereby, when the clutch is engaged, the driving shaft 11 may transmit movement to the driven shaft 16 through the intermediary of torque nut 42 and sleeve 47, which is splined to coupler member 27, and from thence to the driven shaft 16, it being assumed that member 27 is moved to the position shown by the full lines in Fig. 1 by means of yoke 44 and manually slidable rod 46.

Weights 32 are normally urged outwardly by springs 45, which preferably are of sufficient strength to cause the weights to slightly engage the pressure plate 34 with less than the pressure ordinarily required to transmit the full driving torque of shaft 11. Centrifugal weights 32 are also under the influence of the torque nut 42, which is splined to the driven sleeve 47 and adapted to move toward the left by means of the coarse threads 49 formed thereon which engage similar threads 51 formed on the inner race 43 of the second speed gear 22. At some predetermined outward movement of weights 32 the centrifugal force of the weights, which varies as the square of the driven shaft speed, will be modified by the engagement of shoulder 55 with the spring 52 which is maintained in a compressed relation by a split collar 53.

The mechanism described up to this time is quite similar to that shown in applicant's copending application Serial Number 602,056, filed March 30, 1932, and need not be further described, for its operation is easily understood and has been set forth herein for the purpose of explaining the action of the clutch control which forms the principal feature of the present application.

In the structure above described, the clutch 17 will be engaged at driving shaft speeds above a predetermined minimum value and at loads below a predetermined maximum value, but at some combination of high torque load and low engine speed the torque nut 42 will move toward the left, as viewed in Fig. 1, to force weights 32 to their inner position and enable the second speed gear 22 to assume the load. Under certain conditions this operation is satisfactory, but in ordinary vehicle operation it is sometimes desirable to remain in high gear under closed throttle conditions at which ordinarily a gear change would automatically occur.

It may be readily seen that it is not necessary to make a gear change under these conditions, for if more torque is desired all that is necessary is to open the throttle slightly and cause the engine to deliver the necessary amount. In order to provide a clutch control that will enable the gear changes to be somewhat under the control of the operator, the backing plate 40 is made slidable and abuts a sleeve 54 through the intermediary of a thrust bearing 56. Sleeve 54 is provided with screw threads 57 coacting with similar threads on a collar 58, non-rotatably secured to the transmission housing by screw 59. Worm threads 61 are also provided on the sleeve 54 which are in mesh with a worm 62 rotatable in the housing and secured to a lever 63 interconnected with the accelerator pedal 64 by a rod 66. Pedal 64 is normally held in the position shown in Fig. 1 by spring 67 and the usual throttle valve spring 65, the former of which tends to rotate the lever 68 in a clockwise direction about pivotal point 69 of the framework.

In the operation of accelerator pedal 64 for control of the engine, it may be tilted about pivot 71 to force rod 72 toward the left to open the engine throttle valve (not shown). It may be readily observed that tilting of the pedal about pivotal point 71 in no manner influences the operation of the clutch 17, but if it should be desired to change to a lower gear ratio, pressure may be applied to the accelerator pedal in a line with pivot 71 whereby lever 68 is rotated in a counter-clockwise direction and the sleeve 54 is moved toward the left by rotation of worm 62 and the pressure upon the clutch plates is relieved. When sleeve 54 has been moved far enough to cause the pressure on the clutch plates to be insufficient to transmit the full engine output torque at any given throttle position, the clutch will slip. As soon as slippage occurs the second speed gear 22 will assume the load and the torque reaction between the threads 49 and 51 will move nut 42 and sleeve 55 toward the left to depress the weights and completely disengage the clutch. The aforementioned actuation of the sleeve 55 will ordinarily occur when weights 32 have moved outwardly a sufficient distance for shoulder 55 to engage spring 52, and further outward movement of weights 32 will be opposed by the action of the spring, the action being such that the capacity of the clutch is decreased as the backing plate is moved toward the left.

It may be readily observed that in the operation of the transmission above described, the gear changes are automatically made under the influence of torque and driven shaft speed, but that the tendency to gear changes may be modified at the will of the operator by a selective operation of the accelerator pedal 64, the selective operation being accomplished by the direction of pressure upon the pedal.

While a preferred embodiment of the invention has been illustrated and described, it is understood that this showing and description are illustrative only and that the invention is not regarded as limited to the form shown and described, or otherwise, except by the terms of the following claims:

What is claimed is:

1. An automatic transmission mechanism for an automotive vehicle having an engine control, comprising a driving shaft, a driven shaft, a friction clutch for connecting the shafts in a high speed ratio, means for connecting the shafts in a low speed ratio, means responsive to driven shaft load for controlling the clutch, means to engage low gear when the clutch is released, and mechanical means connected with the engine control to vary the torque capacity of the clutch.

2. An automatic transmission mechanism for an automotive vehicle having an engine control, comprising a driving shaft, a driven shaft, a friction clutch for connecting the shafts in a high speed ratio, means for connecting the shafts in a low speed ratio, means responsive to driven shaft speed for controlling the clutch, means to engage low gear when the clutch is released, and mechanical means connected with the engine control to vary the torque capacity of the clutch.

3. An automatic transmission mechanism for an automotive vehicle having an engine control comprising a driving shaft, a driven shaft, a friction clutch for connecting the shafts in a high speed ratio, means for connecting the shafts in a low speed ratio, means responsive to driven shaft load and speed for controlling the clutch, means to engage low gear when the clutch is released, and mechanical means connected with the engine control to vary the torque capacity of the clutch.

4. An automatic transmission mechanism for a vehicle having an engine and a control therefor comprising a driving shaft, a driven shaft, a friction clutch for connecting the shafts in a high speed ratio, means for connecting the shafts at a low speed ratio when the clutch is released, means for automatically actuating the clutch, mechanical means operable on the clutch for varying the effect of the automatic means, a pivoted lever connected to the mechanical means; and a manually operable member pivoted on the lever and connected to the engine control.

5. An automatic transmission mechanism for a vehicle having an engine and a control therefor comprising a driving shaft, a driven shaft, a friction clutch for connecting the shafts in a high speed ratio, means for connecting the shafts at a low speed ratio when the clutch is released, means for automatically actuating the clutch, and mechanical means selectively operable by the engine speed control and operable on the clutch to vary the effect of the automatic means and the speed of the engine.

6. An automatic transmission mechanism for a vehicle having an engine comprising a driving shaft, a driven shaft, a friction clutch for connecting the shafts in a high speed ratio, means for connecting the shafts at a low speed ratio when the clutch is released, means for automatically actuating the clutch, an engine throttle control, and mechanical means pivotally connected to the throttle control and selectively operable to vary the effect of the automatic means.

7. An automatic transmission mechanism for a vehicle having an engine and a control therefor comprising a driving shaft, a driven shaft, a friction clutch connecting the shafts, means including an overrunning device for connecting the shafts around the clutch, automatic means for actuating the clutch, a backing plate for the clutch to absorb the reaction of the automatic means connected to the engine control, and mechanical means operable by actuation thereof to move the backing plate to vary the effect of the automatic means.

8. An automatic transmission mechanism for a vehicle having an engine comprising a driving shaft, a driven shaft, a friction clutch connecting the shafts, means including an overrunning device for connecting the shafts around the clutch, automatic means for actuating the clutch, a backing plate for the clutch to absorb the reaction of the automatic means, a throttle control for the engine, and mechanical means connected to the throttle control selectively operable thereby to move the backing plate toward and away from the automatic means.

9. An automatic transmission mechanism for a vehicle having an engine and a control therefor comprising a driving shaft, a driven shaft, a friction clutch connecting the shafts, means including an overrunning device for connecting the shafts around the clutch, automatic means for actuating the clutch, a backing plate for the clutch to absorb the reaction of the automatic means, a threaded sleeve forming an abutment for the backing plate, and means connected with the engine control to rotate the sleeve to change the axial position of the backing plate.

10. An automatic transmission mechanism for a vehicle having an engine comprising a driving shaft, a driven shaft, a friction clutch connecting the shafts, means including an overrunning device for connecting the shafts around the clutch, automatic means for actuating the clutch, a backing plate for the clutch to absorb the reaction of the automatic means, a sleeve concentric with the driving shaft forming an abutment for the backing plate, an engine throttle control, and means connected with the engine control selectively operable thereby to move the sleeve axially of the shafts.

11. An automatic transmission for a vehicle having an engine control comprising a driving shaft, a driven shaft, a friction clutch for connecting the shafts, centrifugal weights for actuating the clutch, said clutch being axially movable relative to said weights, resilient means adapted to counteract the force of the weights at a predetermined outward movement thereof, a movable abutment for the clutch, and mechanical means connected with the engine control manually movable therewith to change the axial position of the abutment.

12. An automatic transmission for a vehicle having an engine comprising a driving shaft, a driven shaft, a friction clutch for connecting the shafts, centrifugal weights for actuating the clutch, said clutch being axially movable relative to said weights, resilient means adapted to counteract the force of the weights at a predetermined outward movement thereof, a movable abutment for the clutch, and means selectively operable by an engine control to move the abutment and vary the engaging force of the weights.

13. An automatic transmission for a vehicle having an engine comprising a driving shaft, a driven shaft, a friction clutch for connecting the shafts, centrifugal weights for actuating the clutch, said clutch being axially movable relative to said weights, resilient means adapted to counteract the force of the weights at a predetermined outward movement thereof, a movable abutment for the clutch, said abutment being in the form of a threaded sleeve, and means to rotate the sleeve and vary the axial position of the abutment.

14. An automatic transmission for a vehicle having an engine comprising a driving shaft, a driven shaft, a friction clutch for connecting the shafts, centrifugal weights for actuating the clutch, said clutch being axially movable relative to said weights, resilient means adapted to counteract the force of the weights at a predetermined outward movement thereof, a movable abutment for the clutch, said abutment being in the form of a threaded sleeve, an engine throttle control, and means for rotating the sleeve to vary the effect of the weights, said means being connected with the throttle control and selectively operable thereby.

15. An automatic transmission mechanism for a vehicle having an engine control comprising a driving shaft, a driven shaft, gear means including an overrunning device for connecting the shafts to drive the driven shaft at a reduced speed, a variable capacity clutch for connecting the shafts, means operable by the gear means for disengaging the clutch in accordance with driven shaft load, and means interconnected with the engine control for varying the clutch capacity to control the operative connection of the gear means.

16. An automatic transmission for a vehicle having an engine control comprising a driving shaft, a driven shaft, gear means including an overrunning device for connecting the shafts, a friction clutch for connecting the shafts, means associated with the gear means and operative by torque reaction thereon to entirely disengage the clutch, and means interconnected with the engine control for varying the capacity of the clutch.

17. An automatic transmission for a vehicle having an engine control comprising a driving shaft, a driven shaft, gear means including an overrunning device for connecting the shafts, a clutch including friction members for connecting the shafts, centrifugal weights contacting the friction members for controlling the clutch, a movable backing plate for the clutch members means associated with the gear means and operative by torque reaction thereon to depress the weights to entirely disengage the clutch, means for moving the backing plate toward and away from the weights said means being interconnected with the engine control and arranged to move the members toward the weights when the control is moved toward a position wherein the engine speed is reduced.

18. An automatic transmission mechanism for a vehicle having an engine control, a driving shaft, a driven shaft, a clutch including friction members directly connecting the shafts, means for connecting the shafts at a reduced speed ratio when the clutch is disengaged, said clutch having a predetermined torque capacity, means for varying the clutch capacity said capacity varying means being interconnected with the engine control and operable concurrently therewith at the will of the operator.

ROMEO M. NARDONE.